US011894953B2

(12) United States Patent
Xu et al.

(10) Patent No.: US 11,894,953 B2
(45) Date of Patent: Feb. 6, 2024

(54) REMOTE INTERFERENCE IDENTIFICATION AND MITIGATION

(71) Applicant: ZTE Corporation, Guangdong (CN)

(72) Inventors: Hanqing Xu, Guangdong (CN); Jun Xu, Guangdong (CN); Yajun Zhao, Guangdong (CN); Mengzhu Chen, Guangdong (CN); Saijin Xie, Guangdong (CN)

(73) Assignee: ZTE Corporation, Guangdong (CN)

( * ) Notice: Subject to any disclaimer, the term of this patent is extended or adjusted under 35 U.S.C. 154(b) by 383 days.

(21) Appl. No.: 17/180,133

(22) Filed: Feb. 19, 2021

(65) Prior Publication Data
US 2021/0234731 A1 Jul. 29, 2021

Related U.S. Application Data

(63) Continuation of application No. PCT/CN2018/101531, filed on Aug. 21, 2018.

(51) Int. Cl.
*H04W 74/04* (2009.01)
*H04L 25/03* (2006.01)
(Continued)

(52) U.S. Cl.
CPC ..... *H04L 25/03006* (2013.01); *H04B 17/345* (2015.01); *H04W 36/06* (2013.01); *H04W 72/0446* (2013.01); *H04W 72/27* (2023.01); *H04B 7/22* (2013.01); *H04L 1/0003* (2013.01); *H04L 1/0009* (2013.01)

(58) Field of Classification Search
CPC ............. H04L 25/03006; H04L 1/0003; H04L 1/0009; H04B 17/345; H04B 7/22;
(Continued)

(56) References Cited

U.S. PATENT DOCUMENTS

2010/0118805 A1* 5/2010 Ishii .................... H04W 52/283
370/329
2011/0250913 A1* 10/2011 Vajapeyam ....... H04W 74/0833
455/507
(Continued)

FOREIGN PATENT DOCUMENTS

CN  103563477  2/2014
CN  106464345  2/2017
(Continued)

OTHER PUBLICATIONS

Samsung, "Mechanisms for improving network robustness" 3GPP TSG RAN WG1 #94 Gothenburg, Sweden, Aug. 20-24, 2018, R1-1808785, 3 pages (Year: 2018).*
(Continued)

*Primary Examiner* — Lan-Huong Truong
(74) *Attorney, Agent, or Firm* — Perkins Coie LLP

(57) ABSTRACT

Method, systems and devices for identifying and mitigating remote interference, e.g. a downlink transmission from a remote network device interfering with uplink transmissions of another network device, are described. One example method for identifying remote interference includes determining that an interference type is a remote interference, and transmitting, in response to the determining, a reference signal indicative of a resource that was affected by the remote interference. Another example method for identifying remote interference includes detecting a reference signal in a frame, and determining a resource that was affected by a remote interference based on a position of the reference signal in the frame.

20 Claims, 4 Drawing Sheets

(51) Int. Cl.
  *H04B 17/345* (2015.01)
  *H04W 36/06* (2009.01)
  *H04W 72/0446* (2023.01)
  *H04W 72/27* (2023.01)
  *H04B 7/22* (2006.01)
  *H04L 1/00* (2006.01)

(58) Field of Classification Search
  CPC . H04W 36/06; H04W 72/0446; H04W 72/27; H04W 72/541; H04W 92/20; H04W 24/08; H04W 24/02
  See application file for complete search history.

(56) References Cited

U.S. PATENT DOCUMENTS

| | | | |
|---|---|---|---|
| 2013/0322289 A1 | 12/2013 | Zhu et al. | |
| 2014/0056190 A1* | 2/2014 | Qian | H04B 7/2656 370/280 |
| 2017/0238207 A1 | 8/2017 | Hwang et al. | |
| 2020/0044764 A1* | 2/2020 | Xu | H04L 5/0048 |

FOREIGN PATENT DOCUMENTS

| | | |
|---|---|---|
| CN | 106488488 A | 3/2017 |
| CN | 107801199 A | 3/2018 |
| CN | 107888318 A | 4/2018 |

OTHER PUBLICATIONS

CMCC, "Discussion on remote interference management, "R1-1708401, 3GPP TSG RAN WG1 Meeting #89, Hangzhou, P.R. China, May 15-19, 2017, 5 pages (Year: 2017).*

Intel Corporation, "Mechanism for identifying remote gNB interference" 3GPP TSG RAN WG1 #94 Gothenburg, Sweden, Aug. 20-24, 2018, R1-1808785, 3 pages (Year: 2018).*

International Search Report and Written Opinion in International Application No. PCT/CN2018/101531, dated May 20, 2019, 7 pages.

Co-Pending European Extended Search Report dated Apr. 4, 2022, EP Appl. No. 18930083.3, filed Aug. 21, 2018, 15 pages.

Samsung, "Mechanisms for identifying strong gNB interferers" 3GPP TSG RAN WG1 #94 Gothenburg, Sweden, Aug. 20-24, 2018, R1-1808786.

Samsung, "Mechanisms for improving network robustness" 3GPP TSG RAN WG1 #94 Gothenburg, Sweden, Aug. 20-24, 2018, R1-1808785, 3 pages.

Intel Corporation, "Mechanism for identifying remote gNB interference" 3GPP TSG RAN WG1 Meeting #94 Aug. 20-24, 2018 Gothenburg, Sweden, R1-1808704, 3 pages.

Zte "Consideration on RIM framework and mechanisms for improving network robustness" 3GPP TSG RAN WG1 Meeting #94 Gothenburg, Sweden, Aug. 20-24, 2018, R1-1808325, 7 pages.

3rd Generation Partnership Project "Technical Specification Group Radio Access Network" 3GPP TR 38.866 V0.0.0 (Aug. 2018), 10 pages.

Co-Pending Chinese Patent Application No. 201880096766.0, Notification of Grant dated Mar. 31, 2023, 6 pages with unofficial translation.

Co-Pending Chinese Patent Application No. 201880096766.0, Office Action dated Dec. 30, 2022, 14 pages with unofficial translation.

Co-Pending Chinese Patent Application No. 201880096766.0, Office Action dated Jul. 29, 2022, 20 pages with unofficial translation.

Co-Pending EP Appl. No. 18930083.3, filed Aug. 21, 2018, Article 94 Communication dated Oct. 19, 2023, 5 pages.

* cited by examiner

REMOTE INTERFERENCE IDENTIFICATION AND MITIGATION

CROSS-REFERENCE TO RELATED APPLICATIONS

This application is a continuation of International Patent Application No. PCT/CN2018/101531, filed on Aug. 21, 2018, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, therein requiring capabilities to mitigate different types of interference that occur.

SUMMARY

This document relates to methods, systems, and devices for identifying and mitigating remote interference, which is when downlink transmissions from a remote network device (e.g., base station, evolved NodeB (eNB), next generation NodeB (gNB) and so on) interference with the local uplink transmissions of another network device, thereby improving system performance.

In one exemplary aspect, a wireless communication method is disclosed. The method includes determining that an interference type is a remote interference, and transmitting, in response to the determining, a reference signal indicative of a resource that was affected by the remote interference.

In another exemplary aspect, a wireless communication method is disclosed. The method includes detecting a reference signal in a frame, and determining a resource that was affected by a remote interference based on a position of the reference signal in the frame.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Under certain weather conditions, electromagnetic waves propagating in the atmosphere, especially in the troposphere, are influenced by atmospheric refraction, and their propagation trajectories bend toward the ground. An atmospheric duct is a horizontal layer that is created in the lower atmosphere, typically the troposphere. In such a duct the vertical refractive index gradients are such that radio signals (and light rays) are guided or ducted along the length of the duct. The radio signals in the ducts therefore tend to follow the curvature of the Earth. They also experience less attenuation in the ducts than they would if the ducts were not present.

Figure 1:
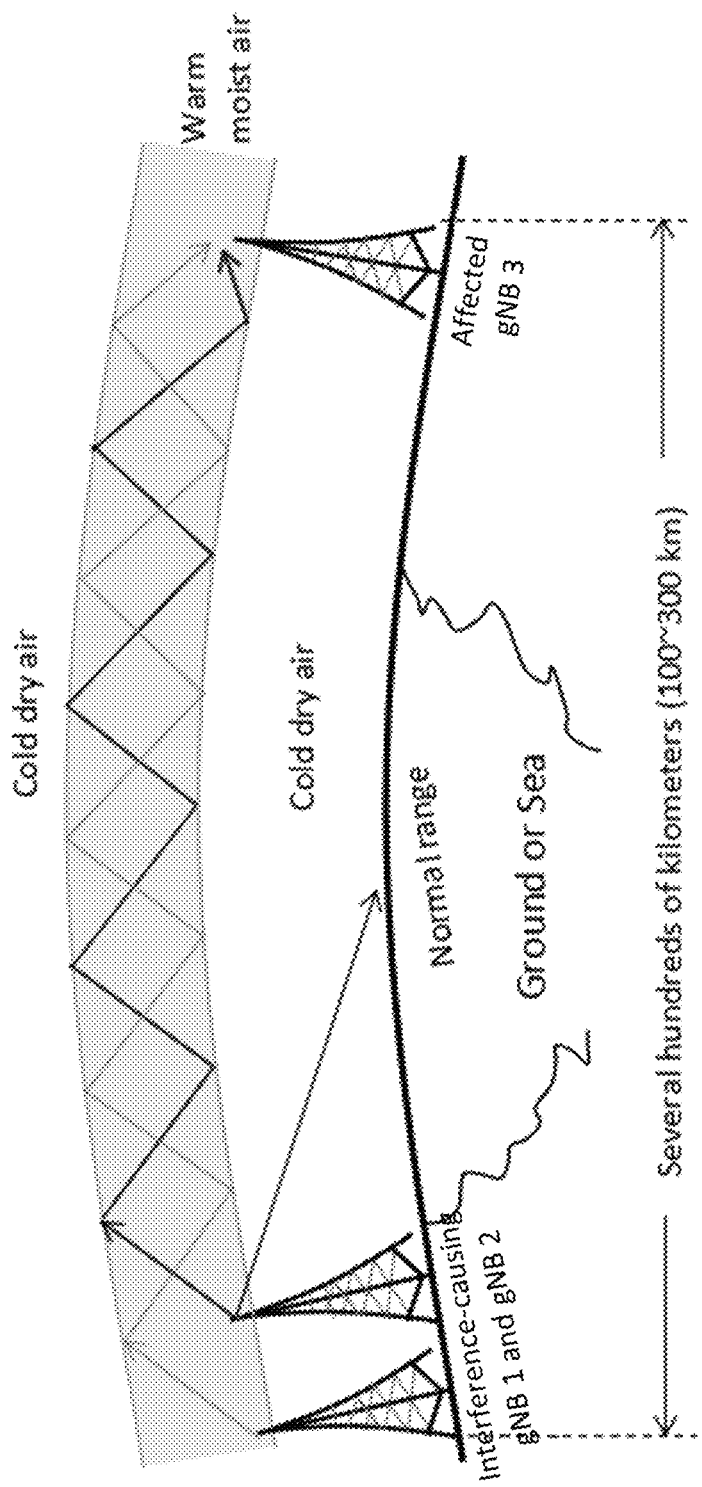
FIG. 1 shows an example remote interference being caused by an atmospheric duct.

As shown in FIG. 1, and in the case of a mobile communication system (e.g., Long Term Evolution (LTE), LTE Advanced, 5th Generation (5G) New Radio (NR) and so on), an atmospheric duct (also referred to as a tropospheric duct) will cause long-distance downlink signals for base stations to mobile stations to travel through the atmosphere with long transmission delay but with a very low attenuation.

In commercial time-domain LTE (TD-LTE) networks, the detrimental effects of remote interference (RI) caused by atmospheric ducts has been identified. The performance of many eNBs and gNBs, due to Interference over Thermal level (IoT) from remote interference, intermittently deteriorates thereby severely impacting network coverage and connection success rate. This IoT degradation is typically caused by the downlink transmissions of a remote network eNB as long as the atmospheric conditions support the formation of atmospheric ducts.

The present document discloses methods, systems and devices that overcome the deleterious effects of remote interference. In an example, this is achieved by the local gNB (referred to as the victim gNB, or the affected gNB, since it is the one being affected) identifying the interference present as remote interference (as compared to other sources of interference, e.g. uplink transmissions of neighboring cells), and the remote gNB (referred to as the aggressor gNB, or the interference-causing gNB, since it is the cause of the remote interference) deducing how many UL resources of the affected gNB were affected by its transmissions.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

1. Exemplary Embodiments for Identifying Remote Interference

Since the local gNB (or eNB, network device, base station, and so on) may be affected by various types of interference, including uplink transmissions from neighboring gNBs, the local gNB must first identify that the interference present is remote interference.

In some embodiments, the local gNB determines that the uplink interference measurement results are higher than or equal to a first threshold, and at least one of the following conditions are satisfied. For example, the local gNB may determine that the measurements results of interference of thermal (IoT) or background noise are higher than or equal to the first threshold. In another example, the measurement results of RSSI (received signal strength indicator) are higher or equal to the first threshold. RSSI can include co-channel interference, adjacent-channel interference and thermal noise. The measurement method of RSSI in base station side is similar to RSSI of UE side defined in 3GPP TS38.215/TS36.214.

Condition 1. The local gNB determines that the uplink interference measurement results exhibit time-domain power decline characteristics, e.g., interference level measured on the uplink (UL) symbols after the downlink (DL), guard period (GP) and flexible (F) symbols.

Figure 2:
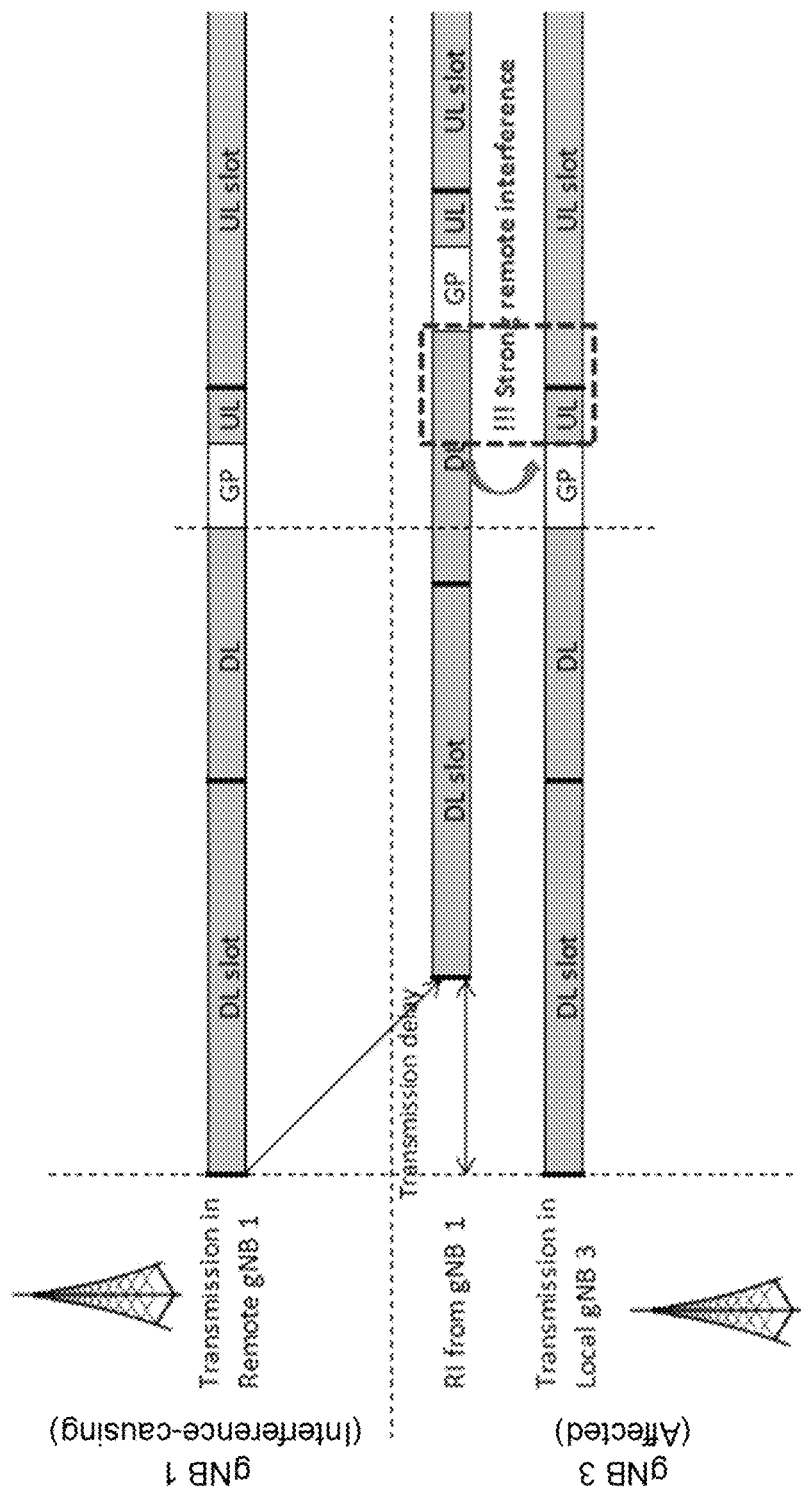
FIG. 2 shows an example of remote interference in a time-domain duplexing system.

As shown in FIG. 2, there may be three types of slots or subframes for a TDD system (e.g., 5G NR). The first type includes only downlink symbols (a downlink slot), the second type includes only uplink symbols (an uplink slot), and the third type includes symbols that are not all uplink or downlink symbols (a special slot).

For the third type of slot or frame, any downlink symbols in the slot are referred to as DwPTS (downlink part of the special slot), any uplink symbols are referred to as UpPTS (uplink part of the special slot), and there may also be flexible (F) or guard period (GP) symbols.

In some embodiments, there may be multiple F or GP symbols between DL symbols and UL symbols in a DL and UL transmission periodicity, which are used to provide protection for uplink and downlink switching. The F symbols can be reconfigured as UL, DL or GP symbols, and if they are configured as uplink or downlink symbols for that frame (or subframe), the are used for the designated purpose as UL and DL symbols, respectively.

In some embodiments, downlink symbols, flexible and guard period symbols, and uplink symbols all exist during one period of a DL and an UL transmission.

In an example, and for an Orthogonal Frequency Division Multiplexing (OFDM) system (e.g., LTE, 5G NR), if the subcarrier spacing (SCS) is 15 kHz, then the period of the UL and DL transmissions is 5 ms. In some embodiments, this period may include 3 DL slots (spanning 3 ms), 1 UL slot (spanning 1 ms) and 1 special slot (spanning 1 ms). In an example, the special slot may be configured to have 9 DL symbols (called the DwPTS), 2 UL symbols (called the UpPTS) and 3 F/GP symbols positioned between the UL and DL symbols.

In some embodiments, and beginning with the first UL symbol after the flexible or guard period symbols, multiple measurement sets may be sequentially configured for the first UL symbol and subsequent UL symbols.

In some embodiments, each set includes one or more adjacent UL symbols. These adjacent UL symbols can be continuous or discontinuous in time (e.g., Set_0 contains symbol 0 and symbol 1, Set_1 contains symbol 3 and symbol 5). The number of UL symbols contained in different sets can be the same or different. These sets are not required to cover all the UL symbols after the F/GP symbols in a DL and UL transmission period. The symbols of set_0 are designated to be at the front of the frame (or subframe), the symbols of set_1 are after set_0, the symbols of set_2 are after set_1, and the symbols of the last set_n are at the end of the frame.

For example, and as described above, the special slot (indexed as slot 0) may be configured to have 9 DL symbols (called the DwPTS), 2 UL symbols (called the UpPTS) and 3 F/GP symbols positioned between the UL and DL symbols. The 2 UL symbols after the F/GP symbols are denoted symbol 0-12 and symbol 0-13 (the notation "slot_index-symbol_index" being adopted for this example). The slot after the special slot may be an UL slot (indexed as slot 1), which includes 14 UL symbols (symbol 1-0, symbol 1-1, symbol 1-2, . . . , symbol 1-13).

In this example, multiple measurement sets may be configured. One such configuration may be set_0 {symbol 0-12, symbol 0-13}, set_1 {symbol 1-0, symbol 1-1}, set_2 {symbol 1-2, symbol 1-3}, . . . , set_7 {symbol 1-12, symbol 1-13}. Another configuration may be set_0 {symbol 0-12, symbol 0-13}, set_1 {symbol 1-0, symbol 1-1, symbol 1-2, symbol 1-3}, set_2 {symbol 1-4, symbol 1-5, symbol 1-6, symbol 1-7}, . . . . Yet another configuration may be set_0 {symbol 0-12}, set_1 {symbol 1-0}, set_2 {symbol 1-2}, . . . , set_7 {symbol 1-12}. Any configuration of the measurement sets is envisioned in the presently disclosed embodiments.

In general, it is assumed n+1 sets are configured (set_0 to set_n). And as described above, the symbols of set_0 are designated to be at the front of the frame (or subframe), the symbols of set_1 are after set_0, the symbols of set_2 are after set_1, and the symbols of the last set_n are at the end of the frame.

Assuming that the interference measurement results of set_0 are greater than the first threshold, when the interference measurement results of the sets satisfy at least one of the following conditions, it is considered that the interference has the time-domain power decline characteristics.

set_0≥set_1≥set_2≥ . . . set_n

From the interference measurement result of set_0, the interference measurement result of set_X (X=1, . . . , n; e.g. X=n) is subtracted, and the result needs to be greater than or equal to a second threshold.

Condition 2. In some embodiments, the downlink SS/PBCH block (synchronization signal/physical broadcast channel block) in NR has 20 PRBs (physical resource blocks). In an example, SS/PBCH block transmission may more frequent than traffic in the nights or in the morning. Furthermore, its transmission power should guarantee the cell coverage. If atmospheric duct phenomenon occurs, SS/PBCH block transmitted from remote gNB will interfere with the UL reception in the local gNB. The interference level in the 20 PRBs will be higher than other bands. If the difference of the interference level between the 20 PRBs and other frequency bands is greater than a third threshold, the local gNB can confirm the uplink interference measurement results have frequency domain characteristics that are indicative of remote interference.

Condition 3. The first base station receives the signal (RIM-RS) sent by other base stations. In some embodiments, the signal transmitted from one base station may be used to assist the other base stations (interference-causing base stations) to indicate to them that they are causing remote interference to the first base station.

In some embodiments, and in order to solve the problem of remote interference, an exemplary procedure may include the following. After the first base station (the affected BS) confirms the remote interference, the remote interference management-reference signal (RIM-RS) transmission (on the first base station) is triggered to indicate to the second base station (the interference-causing BS) to recognize that it is causing remote interference to the affected BS and to deduce how may UL resources of the affected BS are impacted by the interference-causing BS. Then, the interference-causing BS performs an RI management/reduction scheme.

In some embodiments, if the first base station receives the signal (RIM-RS) from other base stations, it can recognize that the other base stations are being affected by remote interference. According to the reciprocity of a TDD system, it can therefore infer it is being interfered by remote interference.

Condition 4. In some embodiments, when the switch for interference management is turned on, the first base station determines the uplink transmission is likely to be affected by the remote interference if the uplink interference measurement results exceeds the first threshold. In response, it triggers the remote interference resolution mechanism.

In some embodiments, specific areas or specific base stations that may be frequently interfered with by atmospheric duct interference can be identified by field testing. For these areas or base stations, the determination condition of RI or trigger condition of the RIM-RS may be simplified. The switch for remote interference management in these base stations can be turned on by default. For example, as long as the uplink interference level is above the first threshold, it is likely to be caused by RI, which results in triggering of the RIM-RS transmission. Otherwise, if the switch is turned off, the interference can be judged as remote interference only when the uplink interference level is higher than the first threshold, and meanwhile it satisfies the other conditions mentioned above.

Condition 5. Before the first base station performs an uplink interference measurement, the neighboring cell is notified by backhaul (e.g., Xn signaling) or air signaling to stop transmission (e.g. UL transmission) on the measurement resource of the first base station, e.g., the neighboring device temporarily ceases (mutes) its transmission.

2. Exemplary Embodiments for Identifying the Interfered Resources

In addition to identifying that the type of interference is remote interference, the presently disclosed technology describes how the affected BS transmits the RIM-RS signal, how the interference-causing BS detects the RIM-RS signal, and how the interference-causing BS deduces which UL resources of the affected BS were affected by remote interference due to the interference-causing BS.

In the examples discussed in this section, it is assumed that the wireless system employs OFDM, the subcarrier spacing (SCS) is 15 kHz, and the slot duration is 1 ms. In some embodiments, the time delay of the interference-causing BS's transmission will not exceed the length of (GP+UpPTS+1 UL slot) after it travels through hundreds of kilometers in atmospheric duct (if it exceeds that length, the interference may be ignored). In other words, the last symbol of interference-causing BS's DwPTS after time delay will not fall behind the UL slot of the affected BS, as shown in FIG. 2.

In some embodiments, and using a TD-LTE configuration as an example, the maximum delay $T_{max}$=GP+UpPTS+1 UL slot=19 OFDM symbols, which corresponds to a transmission distance of about 400 km, with the GP is 3 symbols, UpPTS is 2 symbols, and the UL slot is 14 symbols. If GP is set longer (>3 symbols), $T_{max}$ can be larger than 19 symbols. The transmission distance corresponding to the maximum delay may be longer.

For example, in TD-LTE commercial network field testing, 70% of RI comes from the interference source with distances <200 km, with the furthest recorded interference source being 300 km away. Setting the GP to 9 symbols will solve the RI problem 70% of the time. In other words, 70% of RI interference sources are less than the distance range with 9 symbols delay from local base stations.

In some embodiments, the affected BS may send RIM-RS on the last one or more symbols of DwPTS, which may be detected on the interference-causing BS's UpPTS or subsequent UL slot. Thus, the interference-causing BS monitors RIM-RS on the UL symbols in UpPTS and subsequent UL slot. If the interference-causing BS detects the RIM-RS in the UL symbols, it confirms that the UL symbols and the previous UL symbols are interfered with remote interference. It should be noted that these UL symbols are after DL symbols or the flexible/GP symbols in a DL and UL transmission period. By this method, the interference-causing BS can determine how many UL resources of the affected BS are interfered with remote interference caused by the interference-causing BS.

For example, in 5G NR, the SCS can be equal to greater than 15 kHz, such as 30 kHz, 60 kHz, 120 kHz, 240 kHz. In the case of 30 kHz SCS, one slot has a duration of 0.5 ms. In this case, GP+UpPTS+1 UL slot is still equal to 19 OFDM symbols, but the duration of 19 symbols is reduced by half, which corresponds about a 200 km transmission distance. This implies that if the RIM-RS continues to be sent on the last one or more symbols of DwPTS by the affected BS, RIM-RS will most likely fall on the DL slot after the UpPTS and subsequent UL slot in the interference-causing BS side. If so, the interference-causing BS may not be able to detect RIM-RS on the UpPTS or subsequent UL slot. Thus, the following schemes may be employed in some embodiments of the disclosed technology.

Scheme 1. The first base station sends the signal (RIM-RS) on the last one or more symbols before the flexible symbols or before the guard period symbols. The second base station detects the signal on the UL symbols after the flexible symbols or guard period symbols and subsequent slots (e.g. m slots). In some embodiments, the subsequent slots may be UL slots, or DL slots, or special slots, or any combination thereof.

In some embodiments, the number of slots m detected by the second base station depends on the subcarrier spacing. For example, With a 15 kHz subcarrier spacing, the second base station detects the signal on the UpPTS and the next 1 UL slot.

With a 30 kHz subcarrier spacing, the second base station detects the signal on the UpPTS and the next 2 UL slot.

With a 60 kHz subcarrier spacing, the second base station detects the signal on the UpPTS and the next 4 UL slot.

In some embodiments, if the second base station detects the signal in the DL symbols, it confirms that UL symbols prior to the DL symbols, in a DL and UL transmission period, are interfered with remote interference. In other embodiments, if the second base station detects the signal in the UL symbols, it confirms that the UL symbols and the previous UL symbols, in a DL and UL transmission period, are interfered with remote interference.

Scheme 2. In some embodiments, the first base station sends the signal on the last one or more symbols before the flexible symbols or before the guard period symbols. In this case, the second base station always detects the signal. If the second base station detects the signal in the UL symbols, it confirms that the UL symbols and the previous UL symbols are interfered with remote interference.

Scheme 3. In some embodiments, the first base station sends multiple of the signal (RIM-RS) on the DL symbols before the flexible symbols or before the guard period symbols, e.g. in DwPTS and prior DL slots in a DL and UL transmission period. These signals (RIM-RS) located in different DL symbols may be the same, or carry different information. The former case results in these signals being transmitted repeatedly and has same generating sequence. The latter case results in these signals carrying different information, e.g., base station identity information, the timing information, etc., and be generated with different generating sequences or scrambling sequences. The second base station detects the signal on the UL symbols after the flexible symbols or guard period symbols. The last received signal is used to identified the UL interfered resources. If the second base station detects many signals in some UL symbols, it deduces that the UL symbols in which it detects the last signal and the previous UL symbols, in a DL and UL transmission period, are interfered with remote interference.

In some embodiments, the density of the signals transmitted in DwPTS and DL slot will lead to different detection accuracy and location accuracy of UL interfered resources. If the signals transmitted on each symbol of DwPTS and DL slot, the UL interfered resource can be located accurately.

Scheme 4. The sequence used to generate the signal transmitted by the first base station may be scrambled with the information associated with the UL interfered resources. After detecting the signal, the second base station locates the number of UL interfered resources by sequence detection.

3. Exemplary Methods for Remote Interference Identification and Mitigation

Embodiments of the presently disclosed technology provide methods, systems and devices for remote interference identification and mitigation. The examples of the disclosed technology provided below explain general concepts, and are not meant to be interpreted as limiting. In an example, unless explicitly indicated to the contrary, the various features described in these examples may be combined.

Example 0. In one example, a first base station (e.g., the affected gNB) identifies the type of interference, and sends a signal indicative of resources being interfered with. Then, a second base station (e.g., the interference-causing gNB) detects the signal and deduces the interfered resources.

Example 1. In the context of Example 0, the first base station confirms that the type of interference is remote interference based on the uplink interference measurement results being higher than or equal to the first threshold, and at least meet one of the conditions:
  Condition 1: The uplink interference measurement results have time-domain power decline characteristics, e.g., the interference level measured on UL symbols after DL/GP/F symbols decreases from strong to weak.
  Condition 2: The uplink interference measurements have frequency-domain characteristics.
  Condition 3: The first base station receives the signal (RIM-RS) sent by other base stations, which is indicative of the type of interference being remote interference.
  Condition 4: The switch for remote interference management is turned on.
  Condition 5: Before the first base station performs an uplink interference measurement, the neighboring cell is notified by backhaul (e.g., Xn signaling) or air signaling to stop transmission (e.g. UL transmission) on the measurement resource of the first base station, e.g., the neighboring device temporarily ceases (mutes) its transmission.

Example 2. In the context of Example 1, the uplink interference measurement results are higher than or equal to the first threshold. In some embodiments, the measurements results of interference of thermal (IoT) or background noise are higher or equal to the first threshold. In other embodiments, the measurement results of RSSI (received signal strength indicator) are higher or equal to the first threshold.

Example 3. In the context of Condition 1 in Example 1, and beginning with the first UL symbol after the flexible symbol or guard period symbol, multiple measurement sets are configured sequentially for the symbol and subsequent UL symbols. For notational purposes, it is assumed that n+1 sets are configured (set_0, set_1, . . . set_n), wherein the symbols of set_0 are at the front, the symbols of set_1 are after set_0, the symbols of set_2 are after set_1, and the symbols of the last set_n are at the back.

Example 4. In the context of Examples 1 and 3, when the interference measurement results of the sets satisfy at least one of the following conditions, it is considered that the interference has the time-domain power decline characteristics.
  Condition 1: set_0≥set_1≥set_2≥ . . . set_n
  Condition 2: From the interference measurement result of set_0, the interference measurement result of set_X (X=1, . . . , n; e.g. X=n) is subtracted, and the result needs to be greater than or equal to the second threshold.

Example 5. In the context of Examples 1 and 3, the interference measurement results of at least set 0 are required to be larger than or equal to the first threshold.

Example 6. In the context of Example 0, the first base station sends the signal, and the second base station detects the signal. The specific methods of sending and detecting the signal (RIM-RS) may be implemented as described in Examples 7, 10, 11 and 13.

Example 7. In one example, the first base station sends the signal (RIM-RS) on the last one or multiple symbols before the flexible symbols or before the guard period symbols. The second base station detects the signal on the UL symbols after the flexible symbols or guard period symbols and subsequent slots.

Example 8. In the context of Example 7, the subsequent slots can be UL slots, or DL slots, or special slots.

Example 9. In the context of Example 7, the number of slots detected by the second base station depends on the subcarrier spacing. For example:
  With a 15 kHz subcarrier spacing, the second base station detects the signal on the UpPTS and the next 1 UL slot.
  With a 30 kHz subcarrier spacing, the second base station detects the signal on the UpPTS and the next 2 UL slot.
  With a 60 kHz subcarrier spacing, the second base station detects the signal on the UpPTS and the next 4 UL slot.

Example 10. In the context of Example 6, the first base station sends the signal on the last one or multiple symbols before the flexible symbols or before the guard period symbols. In this example, the second base station always detects the signal.

Example 11. In the context of Example 6, the first base station sends multiple of the signal (RIM-RS) on the DL symbols before the flexible symbols or before the guard period symbols, e.g. in the DwPTS and prior DL slots. The second base station detects the signal on the UL symbols after the flexible symbols or guard period symbols.

Example 12. In the context of Example 11, the density of the signals transmitted in DwPTS and DL slot will lead to different detection accuracy and location accuracy of UL interfered resources. If the signals transmitted on each symbol of DwPTS and DL slot, the UL interfered resource can be located accurately.

Example 13. In the context of Example 6, the sequence used to generate the signal transmitted by the first base station may be scrambled with the information associated with the UL interfered resources. After detecting the signal, the second base station locates the number of UL interfered resources by sequence detection.

Example 14. In the context of Examples 6, 7, 10 and 11, if the second base station detects the signal in the DL symbols, it confirms that UL symbols prior to the DL symbols are interfered with remote interference. Alternatively, if the second base station detects the signal in the UL symbols, it confirms that the UL symbols and the previous UL symbols are interfered with remote interference.

The examples described above may be incorporated in the context of the methods described below, e.g., methods 300 and 400, which may be implemented on a network device (e.g., eNB, gNB, base station, and so on).

Figure 3:
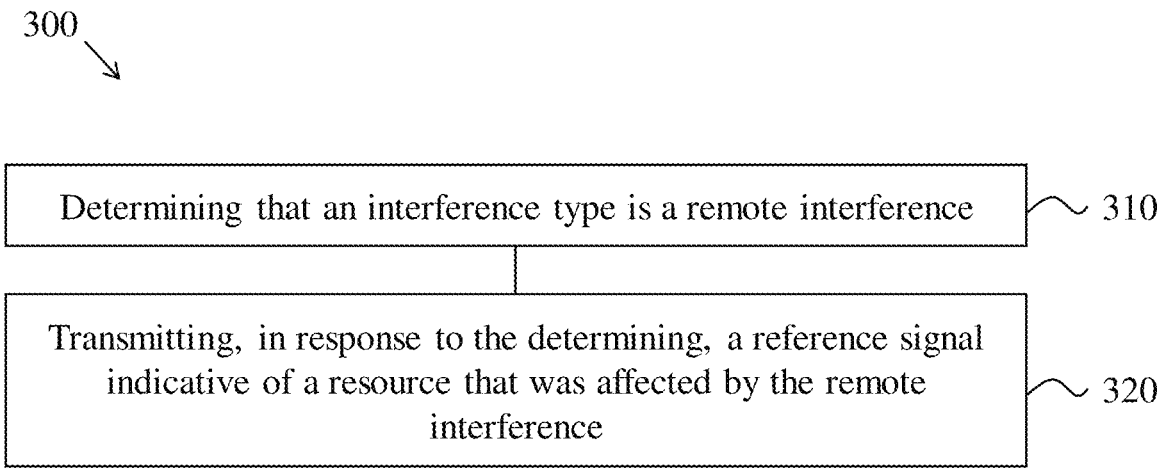
FIG. 3 shows an example of a wireless communication method.

FIG. 3 shows a flowchart of an exemplary method 300 for RI identification and mitigation. The method 300 includes, at step 310, determining that an interference type is a remote interference. In some embodiments, the method 300 may further include measuring an interference level, and determining that it is greater than or equal to a first threshold. In an example, the interference level may be an uplink interference level.

In some embodiments, determining the interference type includes measuring an interference level over a duration of a frame, and determining that the interference level decreases over the duration. In one example, the interference level may be represented by the instantaneous value of the interference level. In another example, the interference level may be represented by a statistical average over a fixed or varying period.

In some embodiments, determining the interference type includes measuring an interference level in a frequency band corresponding to a communication, and determining that the interference level in the frequency band is higher than that in one or more other frequency bands.

In some embodiments, determining the interference type includes receiving a signal from at least one network device indicating that interference experienced by the at least one network device is the remote interference.

In some embodiments, determining the interference type includes determining that a switch indicating the interference type is the remote interference is on.

In some embodiments, measuring the interference level is performed on measurement resources, and determining the interference type includes transmitting, prior to performing the measurements, information associated with the neighboring cells through backhaul signaling or air signaling. In an example, the neighboring cells do not communicate on the measurement resources while the measurements are being performed on those resources.

The method 300 includes, at step 320, transmitting, in response to the determining, a reference signal indicative of a resource that was affected by the remote interference. In some embodiments, the reference signal is a remote interference management-reference signal (RIM-RS). In an example, the resource is an uplink resource.

In some embodiments, the reference signal is transmitted on one or more last downlink symbols that are positioned before flexible symbols or guard period symbols.

In some embodiments, multiple reference signals are transmitted on downlink symbols that are positioned before flexible symbols or guard period symbols.

In some embodiments, and in the context of Example 13, the method 300 further includes generating a reference sequence by scrambling a data sequence with information corresponding to the resource that was affected by the remote interference, and generating the reference signal based on the reference sequence.

In some embodiments, the method 300 further includes performing a remote interference management (RIM) procedure. In an example, performing the RIM procedure includes pausing a communication on the resource for a period of time. In another example, performing the RIM procedure includes increasing a transmit power or adjusting a modulation and coding scheme (MCS) for a subsequent communication on the resource. In yet another example, performing the RIM procedure includes reconfiguring symbols of the resource that was affected by the remote interference to flexible symbols or guard period symbols.

Figure 4:
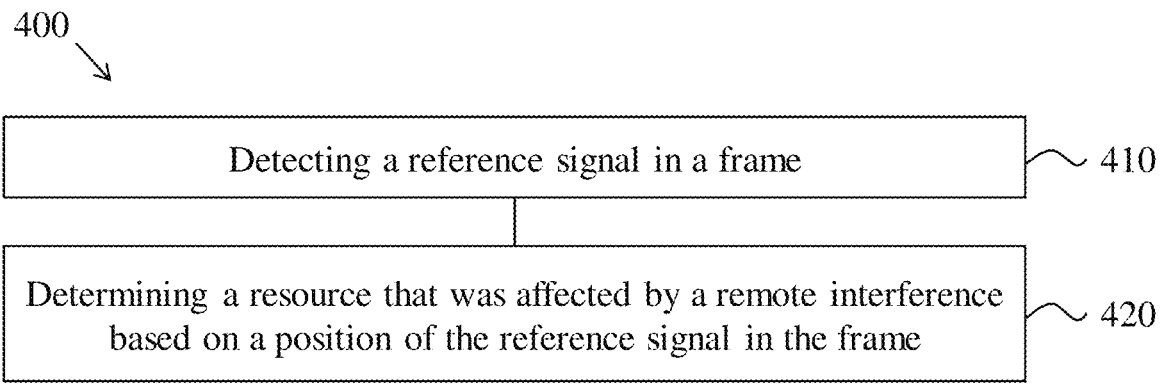
FIG. 4 shows an example of another wireless communication method.

FIG. 4 shows a flowchart of another exemplary method 400 for remote interference identification and mitigation. The method 400 includes, at step 410, detecting a reference signal in a frame.

In some embodiments, the detecting includes detecting the reference signal on one or more slots, wherein a number of the one or more slots is based on a subcarrier spacing of the wireless communication.

The method 400 includes, at step 420, determining a resource that was affected by a remote interference based on a position of the reference signal in the frame. In an example, the resource is an uplink resource and the frame is an uplink frame.

In some embodiments, the detecting includes detecting the reference signal on uplink symbols in the frame. Furthermore, the determining includes determining that the resource comprises the uplink symbols and previous uplink symbols.

In some embodiments, the detecting includes detecting the reference signal on downlink symbols of the frame. Furthermore, the determining includes determining that the resource comprises uplink symbols of the frame that are positioned before the downlink symbols of the frame.

In some embodiments, multiple reference signals, including the reference signal, are detected in the frame, and determining the resource that was affected by the remote interference is further based on a position of the last of the multiple reference signals.

In some embodiments, and in the context of Example 13, the reference signal includes a data sequence that is scrambled by information corresponding to the resource that was affected by the remote interference.

Figure 5:
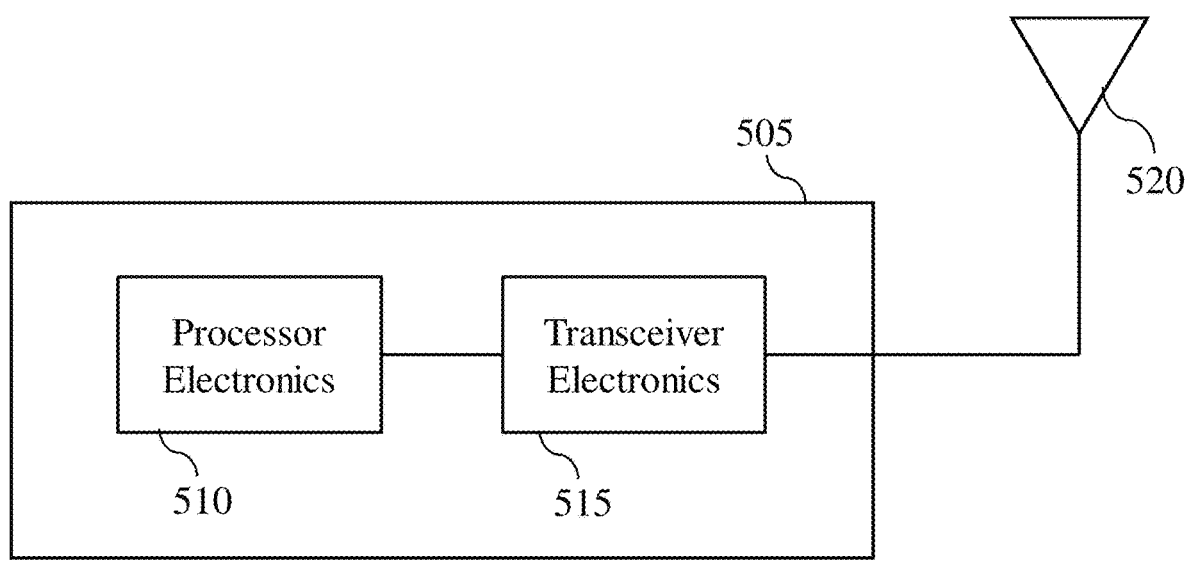
FIG. 5 is a block diagram representation of a portion of an apparatus, in accordance with some embodiments of the presently disclosed technology.

4. Exemplary Implementations for Remote Interference Identification and Mitigation FIG. 5 is a block diagram representation of a portion of an apparatus, in accordance with some embodiments of the presently disclosed technology. An apparatus 505, such as a base station or a wireless device (or UE), can include processor electronics 510 such as a microprocessor that implements one or more of the techniques presented in this document. The apparatus 505 can include transceiver electronics 515 to send and/or receive wireless signals over one or more communication interfaces such as antenna(s) 520. The apparatus 505 can include other communication interfaces for transmitting and receiving data. Apparatus 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the apparatus 505.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   determining that an interference type is a remote interference; and
   transmitting, in response to the determining, a reference signal indicative of a resource that was affected by the remote interference, wherein the transmitting comprises:
   generating a reference sequence by scrambling a data sequence with information corresponding to the resource that was affected by the remote interference; and
   generating the reference signal based on the reference sequence.

2. The method of claim 1, further comprising:
   measuring an interference level; and
   determining that the interference level is greater than or equal to a first threshold.

3. The method of claim 2, wherein the measuring is over a duration of a frame, and wherein the determining the interference type comprises:
   determining that the interference level decreases over the duration.

4. The method of claim 2, wherein the measuring is in a frequency band corresponding to a communication, and wherein the determining the interference type comprises:
   determining that the interference level in the frequency band is higher than that in one or more other frequency bands.

5. The method of claim 2, wherein the determining the interference type comprises:
   receiving a signal from at least one network device indicating that interference experienced by the at least one network device is the remote interference.

6. The method of claim 2, wherein the determining the interference type comprises:
   determining that a switch indicating the interference type is the remote interference is on.

7. The method of claim 2, wherein the measuring the interference level is performed on measurement resources, and wherein the determining the interference type comprises:
   transmitting, prior to the measuring the interference level, information associated with the measurement resources to neighboring cells through backhaul signaling or air signaling,
   wherein the neighboring cells do not communicate on the measurement resources during the measuring the interference level.

8. The method of claim 1, wherein the reference signal is transmitted on one or more last downlink symbols that are positioned before flexible symbols or guard period symbols.

9. The method of claim 1, further comprising:
performing a remote interference management (RIM) procedure.

10. The method of claim 9, wherein the performing the RIM procedure comprises:
reconfiguring symbols of the resource that was affected by the remote interference to flexible symbols or guard period symbols, or
pausing a communication on the resource for a period of time, or
increasing a transmit power or adjusting a modulation and coding scheme (MCS) for a subsequent communication on the resource.

11. The method of claim 1, wherein the transmitting comprises:
transmitting multiple reference signals on downlink symbols that are positioned before flexible symbols or guard period symbols.

12. The method of claim 1, wherein the reference signal is a remote interference management-reference signal (RIM-RS).

13. A method for wireless communication, comprising:
detecting a reference signal in a frame; and
determining a resource that was affected by a remote interference based on a position of the reference signal in the frame,
wherein the reference signal comprises a data sequence scrambled by information corresponding to the resource that was affected by the remote interference.

14. The method of claim 13, wherein the detecting comprises:
detecting the reference signal on downlink symbols of the frame, wherein the resources comprise uplink symbols of the frame that are positioned before the downlink symbols of the frame.

15. The method of claim 13, wherein the detecting comprises:
detecting the reference signal on uplink symbols in the frame that are positioned after flexible symbols or guard period symbols.

16. The method of claim 13, wherein multiple reference signals, including the reference signal, are detected in the frame, and wherein the determining the resource that was affected by the remote interference is further based on a position of a last of the multiple reference signals.

17. The method of claim 13, wherein the detecting comprises:
detecting the reference signal on one or more slots, wherein a number of the one or more slots is based on a subcarrier spacing of the wireless communication.

18. A method for wireless communication, comprising:
detecting a reference signal in a frame; and
determining a resource that was affected by a remote interference based on a position of the reference signal in the frame, wherein the detecting comprises:
detecting the reference signal on uplink symbols in the frame, wherein the resources comprise the uplink symbols and previous uplink symbols.

19. The method of claim 18, wherein multiple reference signals, including the reference signal, are detected in the frame, wherein the determining the resource that was affected by the remote interference is further based on a position of a last of the multiple reference signals.

20. The method of claim 13, wherein the detecting comprises:
detecting the reference signal on uplink symbols in the frame, wherein the resources comprise the uplink symbols and previous uplink symbols.

* * * * *